United States Patent [19]

Hubben et al.

[11] Patent Number: 5,782,438
[45] Date of Patent: Jul. 21, 1998

[54] VERSATILE MOUNTING AND ADJUSTMENT SYSTEM FOR PASSIVE INFRARED DETECTOR

[75] Inventors: Edward B. Hubben, Skaneateles; Curtis J. Royce, Syracuse, both of N.Y.

[73] Assignee: Pass & Seymour, Inc., Syracuse, N.Y.

[21] Appl. No.: 594,770

[22] Filed: Jan. 31, 1996

[51] Int. Cl.⁶ ........................................ G12B 9/00
[52] U.S. Cl. ................. 248/27.3; 248/343; 248/906
[58] Field of Search ............... 248/27.1, 27.3, 248/342, 343, 906

[56] References Cited

U.S. PATENT DOCUMENTS

| | | | |
|---|---|---|---|
| 4,444,369 | 4/1984 | Job | 248/27.1 |
| 5,624,202 | 4/1997 | Grierson | 248/343 X |

*Primary Examiner*—Ramon O. Ramirez
*Attorney, Agent, or Firm*—Bond, Schoeneck & King, LLP

[57] ABSTRACT

A mounting member for engagement with the housing of a PIR device includes a plurality of elongated, flexible arms for mounting the device in an operative position on a ceiling panel. The arms are hingedly attached to the mounting member and extend to terminal ends which are attached to one another. The arms may be moved toward one another to a flexed position to permit insertion through an opening in the ceiling panel, and return to their unflexed position to engage the panel adjacent the periphery of the opening. A first plurality of relatively short legs having inwardly directed hook portions are provided on the mounting member for engagement with the horizontal flange on an inverted T-shaped track member for supporting ceiling panels. A second plurality of short legs having outwardly directed hooked portions permit engagement of the mounting member with a wall plate having an opening therein. The mounting member and device housing may be jointly rotated about the central axis of the device lens for selective positioning of lens segments in a desired orientation, aided by the presence of fixed indicia on the device housing. Also, the device housing may be rotated with respect to the mounting member and frictionally secured in the desired position.

72 Claims, 7 Drawing Sheets

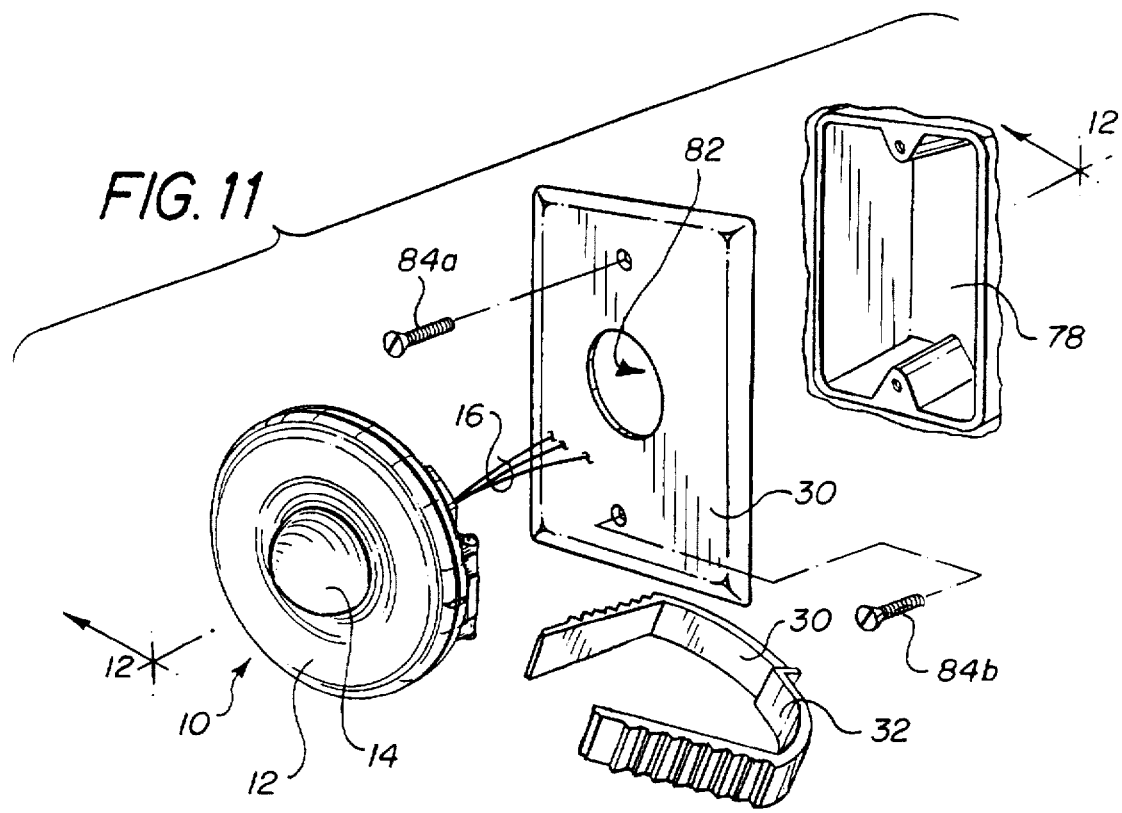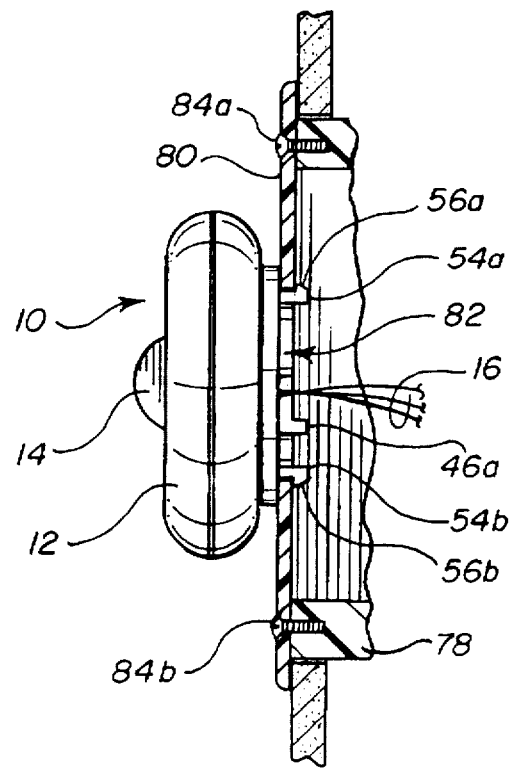

5,782,438

VERSATILE MOUNTING AND ADJUSTMENT SYSTEM FOR PASSIVE INFRARED DETECTOR

BACKGROUND OF THE INVENTION

The present invention relates to mounting and adjustment systems for passive infrared (PIR) detectors, and more specifically to a PIR detector including a housing for attachment to a support member in a manner providing a plurality of mounting options, as well as rotational adjustment of the housing relative to the support member, and to novel features of the support member per se.

PIR detectors are commonly positioned in selected locations to provide control devices responsive to heat emanating from a human body in proximity to the detector. The control device may be used to activate an alarm in security systems intended to detect the presence of an intruder, or other unauthorized entry into a secured space. Alternatively, such control devices may be used to turn lights on and off in the presence or absence of one or more people in the space monitored by the PIR detector.

It is the usual practice to mount PIR detectors in unobtrusive locations on a wall or ceiling of a room to be monitored for human presence. The detector includes a lens, e.g., a multi-segmented, dome-shaped lens, for focusing infrared radiation from various portions of the room onto an infrared sensing element. In some situations it is desirable that the lens element be selectively adjustable to position the focal axes of the lens segments at preselected locations within the room.

In one aspect, the present invention provides mounting means for a PIR detector housing which permits mounting upon any of a plurality of different types of pre-existing wall or ceiling structure.

Another useful feature of the invention is means for mounting a PIR detector in an opening in a panel of a wall or ceiling with physical access to only one side of the panel.

The disclosed embodiment further provides a mounting system for a PIR detector which permits quick and easy, yet accurate, positioning of the focal axes of a plurality of lens segments about each of an elevation axis and an azimuth axis.

An additional feature assists the installer of a PIR detector in determining the azimuthal position of a focal axis of known elevation.

In a more general sense, the object of the invention is to provide a novel and improved, highly versatile, yet simple and economical mounting system for a PIR detector.

Other objects will in part be obvious and will in part appear hereinafter.

SUMMARY OF THE INVENTION

The PIR detector and its mounting system consist of two separable parts. The detector proper includes a dome-shaped lens surrounded by a generally toroidal housing containing conventional electronic components of the detection system which generates an electrical signal in response to reception of infrared radiation from a human body. Wires for connecting the detector to an electrical system extend from the rear of the housing.

The other part, i.e. the support member, is a unitary, molded, plastic part. It includes a generally circular, central portion with an opening for passage of the wires extending from the rear of the detector housing. The detector housing is frictionally engaged with the central portion of the support member adjacent the periphery thereof by a pin or screw about which the housing is adjustably rotatable with respect to the support member.

A pair of flexible, curved arms extend from integral, hinged connections on opposite sides of the central portion of the support member. The arms may be moved about their hinged connections to bring together and connect their terminal ends. In the unflexed position, linear portions of the arms diverge outwardly at acute angles from the circular portion, and curved portions extend inwardly to the connection of their terminal ends. The outer surface of the outwardly diverging portions of the arms include a succession of transversely extending serrations or teeth.

In a first manner of mounting, a circular opening is formed in a wall or ceiling panel with a diameter smaller than the maximum transverse dimensions of both the unflexed, connected arms, and the central portion of the support member. The flexibility of the arms permits central portions thereof to be moved toward one another, e.g., by pressure applied with the fingers and thumb of one hand, until the maximum transverse dimension is less than the diameter of the wall/ceiling opening. The connected ends of the arms are then moved through the opening from one side and the pressure urging the arms toward one another is removed, whereupon the teeth on the outer surfaces of the arms engage the edges of the opening. The support member is thus retained in engagement with the wall/ceiling panel, opposing surfaces of the central portion of the support member and the ceiling panel being in mutual contact.

The support member may alternatively be mounted upon the conventional, inverted T-shaped track members which form a support grid for the panels of a drop ceiling. For this purpose, a pair of legs are provided, having diametrically opposed, inwardly facing hook portions for engagement with the edges of the horizontal flanges of the track member. A third mounting option is provided by an additional pair of legs having outwardly facing protrusions for engagement with the edge of a circular opening in a plate installed on a wall of the space to be monitored.

The foregoing and other features of the PIR detector mounting means will be more readily understood and fully appreciated from the following detailed description, taken in conjunction with the accompanying drawings.

BRIEF DESCRIPTION OF THE DRAWINGS

FIG. 11 is an exploded perspective view of the assembled PIR device and support member, an apertured mounting plate and wall box; and FIG. 12 is a side elevational view taken on the line 12—12 of FIG. 11, showing the unit mounted upon the plate.

DETAILED DESCRIPTION

Figure 1:
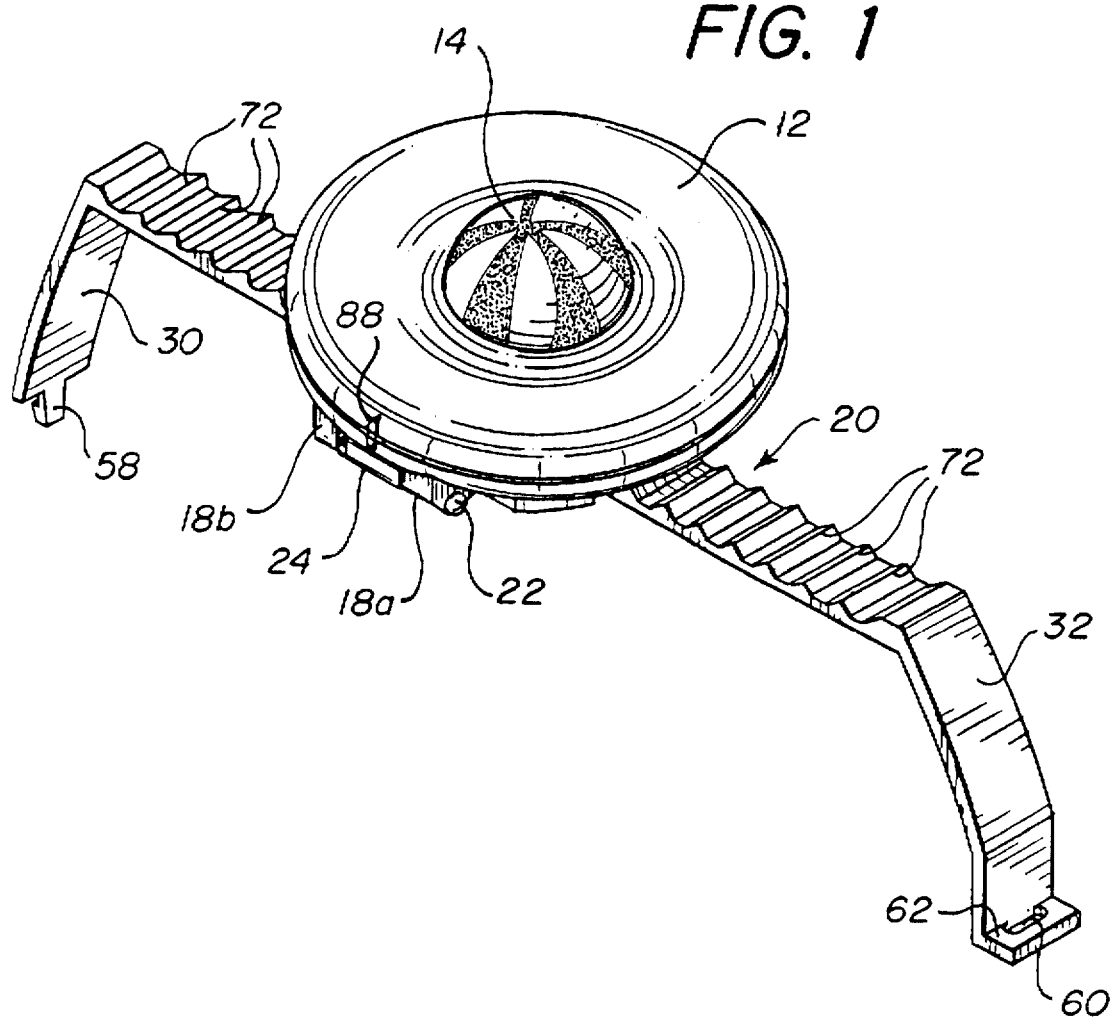
FIG. 1 is a perspective view of the PIR device and support member in assembled condition.

Referring now to the drawings, an electronic device known as a passive infrared (PIR) detector, denoted generally by reference numeral 10, includes conventional circuit elements within enclosed housing 12. Hemispherical lens element 14 extends through a central opening in one side of housing 12, which is of generally toroidal configuration in the disclosed embodiment. Although the external shape of housing 12 is of no consequence to the present invention, it is preferred that the housing be supported for rotation about the central axis of lens 14, as explained hereinafter.

Figure 2:
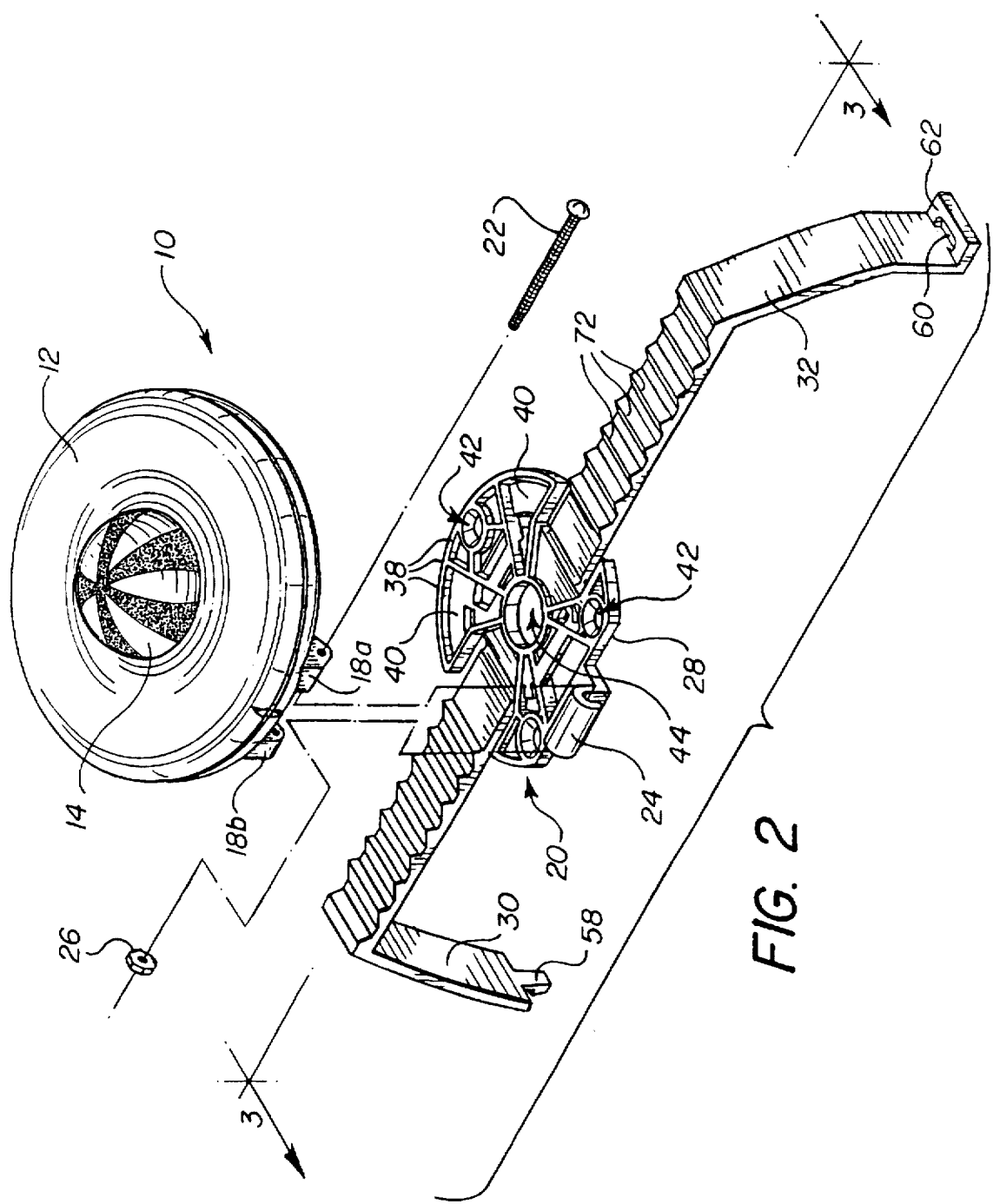
FIG. 2 is a perspective view, taken from substantially the same position as FIG. 1, showing the device and support member separated.

Housing 12 is substantially flat on its rear surface, i.e., the surface opposite lens 14. The rear wall of housing 12 has a central opening through which wires 16 (FIGS. 7–12) extend to connect the elements within the housing to an external power source and other elements such as actuating means for a switch (not shown). The switch may control the supply of power to electric lights, an alarm device, or other circuitry which is to be actuated in response to the presence or absence in a designated area of a source of infrared radiation, e.g., a human body. In FIGS. 1 and 2, spherical segments emanating from the central axis of lens 14 are shown as alternately shaded and unshaded portions, indicating alternately long and short viewing angles of the lens to enhance the total field of view, as is conventional in such devices.

Figure 1A:
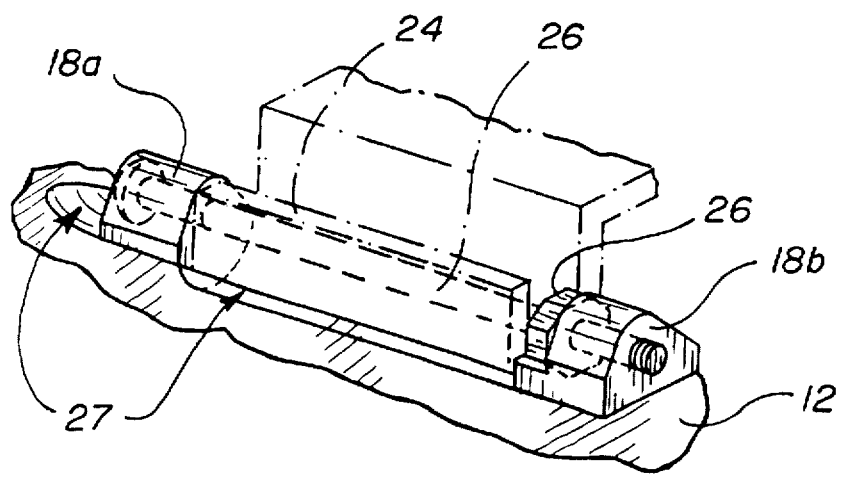
FIG. 1A is an enlarged, inverted, fragmentary, perspective view of portions of the elements of FIG. 1.

Housing 12 includes a pair of integral, spaced lugs 18a and 18b, having coaxially aligned, through openings. Housing 12 is mounted upon a support member indicated generally by reference numeral 20 by means of screw 22, which passes through the opening in lug 18a, through hook-shaped extension 24 on one side of support member 20, and into the opening in lug 18b. Screw 22 is engaged by nut 26, which is disposed between one side of extension 24 and lug 18b, as best seen in FIG. 1A, inverted from FIG. 1. Trough-like recess 27 in housing 12 extends between lugs 18a and 18b to accommodate the curved, outer surface of extension 24, and on the outside of lug 18a to facilitate access to the head of screw 22 with a screwdriver. When support member 20 is mounted upon a fixed support in one of the manners to be described, housing 12 may be rotated relative to support member 20 about the axis of screw 22 and the relative positions of the housing and support member adjustably fixed at a desired angle by tightening screw 22 in nut 26 to frictionally engage opposed surfaces of extension 24 between lug 18a and nut 26.

Figure 3:
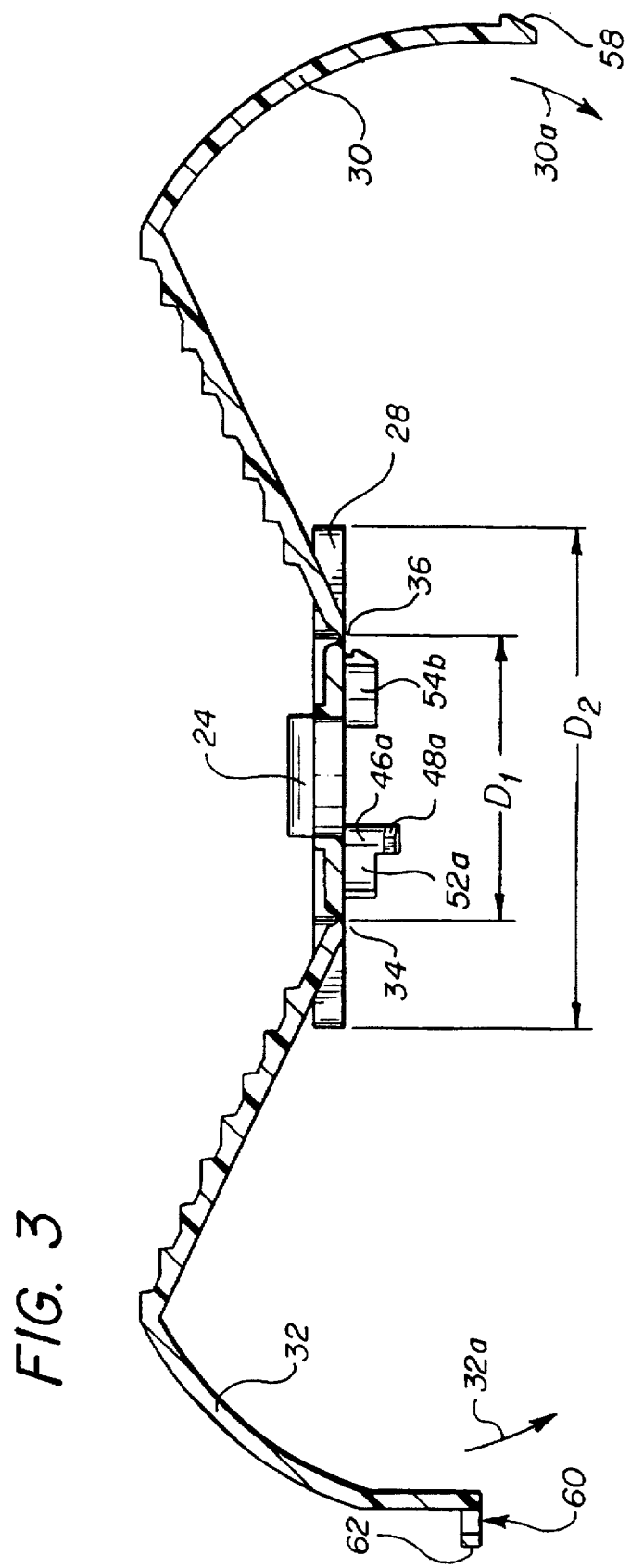
FIG. 3 is an elevational view of the support member in section on the line 3—3 of FIG. 2.

Support member 20 is formed as a unitary, plastic molding having generally circular, central portion 28 with flexible, elongated arms 30 and 32 attached to opposite sides thereof by relatively thin sections providing integral hinges at the positions indicated by reference numerals 34 and 36 in FIG. 3. Central portion 28 includes, on the surface seen in FIG. 2, a plurality of peripheral, radial and otherwise extending ribs 38, surrounding various recessed, planar surface portions 40 and through openings 42. The surfaces of all of ribs 38 are in a common plane, normal to the axis of central opening 44.

Figure 4:
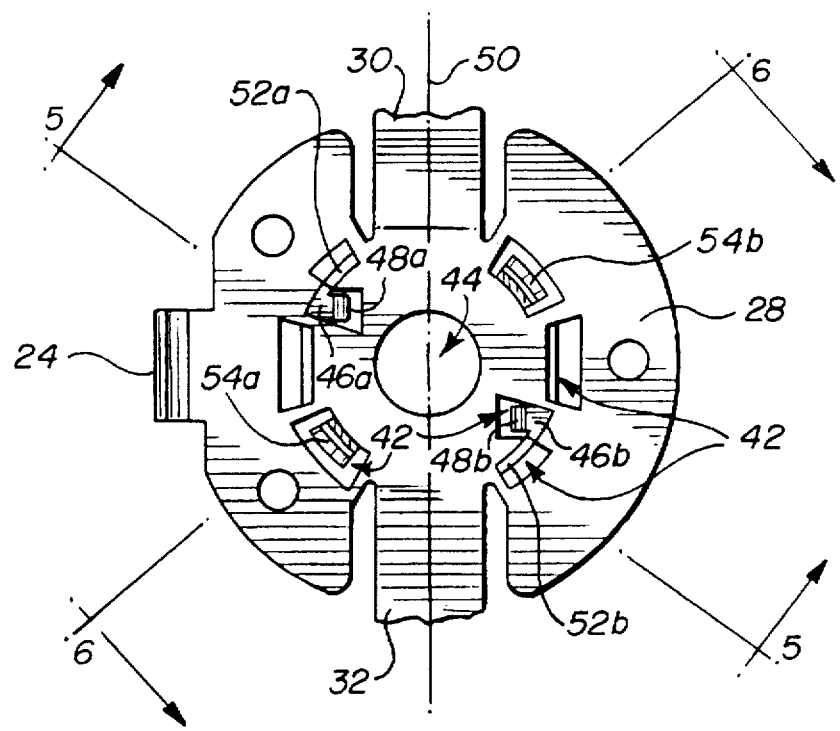
FIG. 4 is a fragmentary, plan view of the support member, showing the side opposite that seen in FIGS. 1 and 2.
Figure 5:
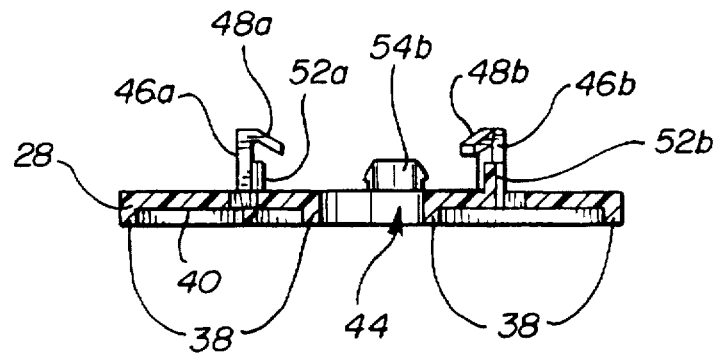
FIGS. 5 and 6 are elevational views of the central portion of the support member, in section on the lines 5—5 and 6—6, respectively, of FIG. 4.

The obverse surface of central portion 28, i.e., the surface opposite that seen in FIG. 2, is shown in FIG. 4 with fragments of arms 30 and 32. A pair of first legs 46a and 46b extend outwardly from the obverse surface of portion 28 on diametrically opposite sides of opening 44. Hook portions 48a and 48b extend integrally from the upper ends of legs 46a and 46b, respectively, toward the centerline through arms 30 and 32, denoted by reference numeral 50 in FIG. 4. Arcuate wall portions 52a and 52b extend integrally from one side of each of legs 46a and 46b, respectively.

Figure 6:
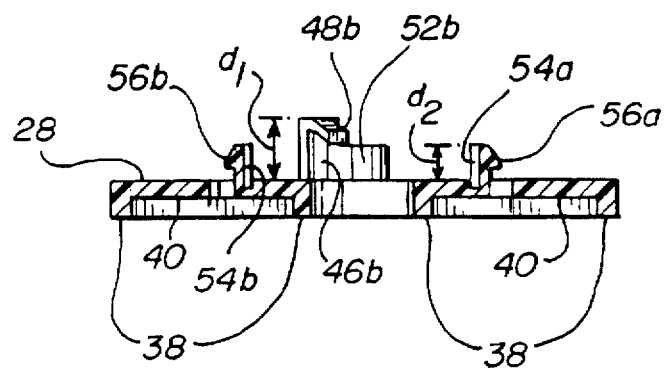

A pair of second legs 54a and 54b extend outwardly from the obverse surface of central portion 28, diametrically opposite one another and spaced approximately midway between legs 46a and 46b. Protrusions 56a and 56b extend outwardly, i.e., away from central opening 44, from legs 54a and 54b, respectively, to define shoulders spaced a predetermined distance from the plane of the obverse surface. As indicated in FIG. 6, the height $d_1$ of legs 46a and 46b is greater than the height $d_2$ of legs 54a and 54b which is also the height of wall portions 52a and 52b.

Arms 30 and 32 may be pivoted about their hinged connections 34 and 36 relative to central portion 28 in the directions indicated by lines 30a and 32a in FIG. 3 to bring the free ends together. The free ends may be joined to one another by passing hook 58 on arm 32 through opening 60 in outwardly extending portion 62 on arm 30. Arms 30 and 32 are shown in their as-molded, undistorted form in FIG. 3.

Figure 7:
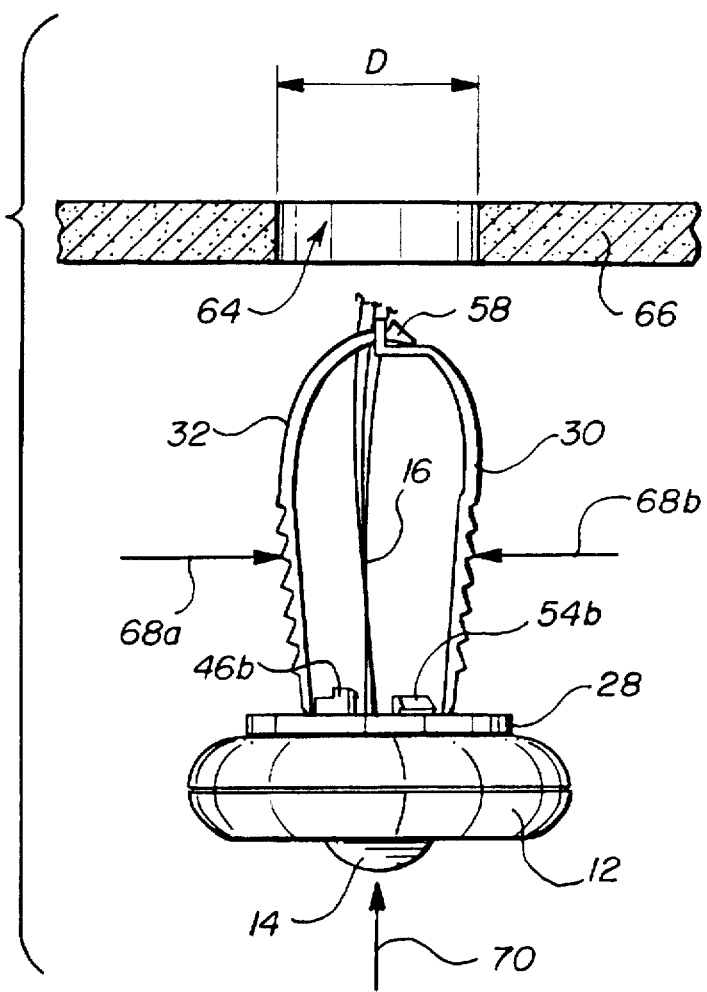
FIGS. 7 and 8 are elevational views of the assembled PIR device and support member, in preparation for and after installation, respectively, in preformed opening in a ceiling panel, or the like, the latter being shown in section.
Figure 8:
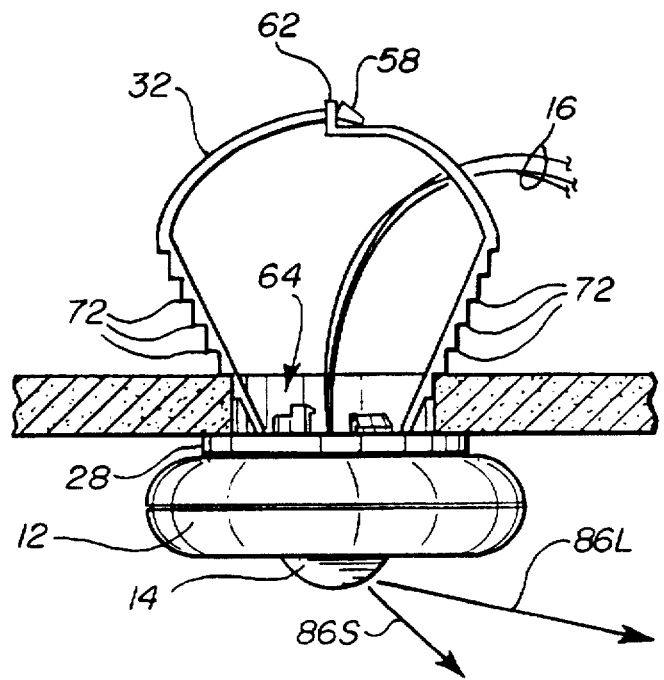

A first means of mounting support member 20, with PIR device 10 attached thereto, is illustrated in FIGS. 7 and 8. Circular opening 64 having a diameter D is formed in panel 66 of a conventional, suspended ceiling. Arms 30 and 32, with their initially free ends attached, are pressed toward one another by the thumb and fingers of the installer, as indicated by arrows 68a and 68b. Due to their natural flexibility, arms 30 and 32 may be deflected inwardly by such pressure to a transverse dimension less than D, whereby the device may be moved upwardly, as indicated by arrow 70. During such movement, arms 30 and 32 are moved through opening 64 to a position wherein the major parts of the arms are above panel 66 and the remainder is within opening 64, as seen in FIG. 8.

Upon release of the inwardly directed pressure, arms 30 and 32 return to their undeformed positions with linear sections extending angularly outwardly from hinged connections 34 and 36 to central portion 28, and arcuate sections curving inwardly to the connected ends. An evenly spaced succession of laterally extending teeth 72 are formed in the outwardly facing surfaces of the linear portions of arms 30 and 32. Due to the configuration of arms 30 and 32, one of teeth 72 on each arm will engage the upper edge of opening 64 and retain the device in position with central portion 20 against the lower surface of panel 66. It will be noted from FIG. 8 that diameter D of opening 64 is larger than the spacing between hinged connections 34 and 36 and smaller than the cross-dimension of central portion 28, represented in FIG. 3 by dimensions $D_1$ and $D_2$, respectively.

Figure 9:
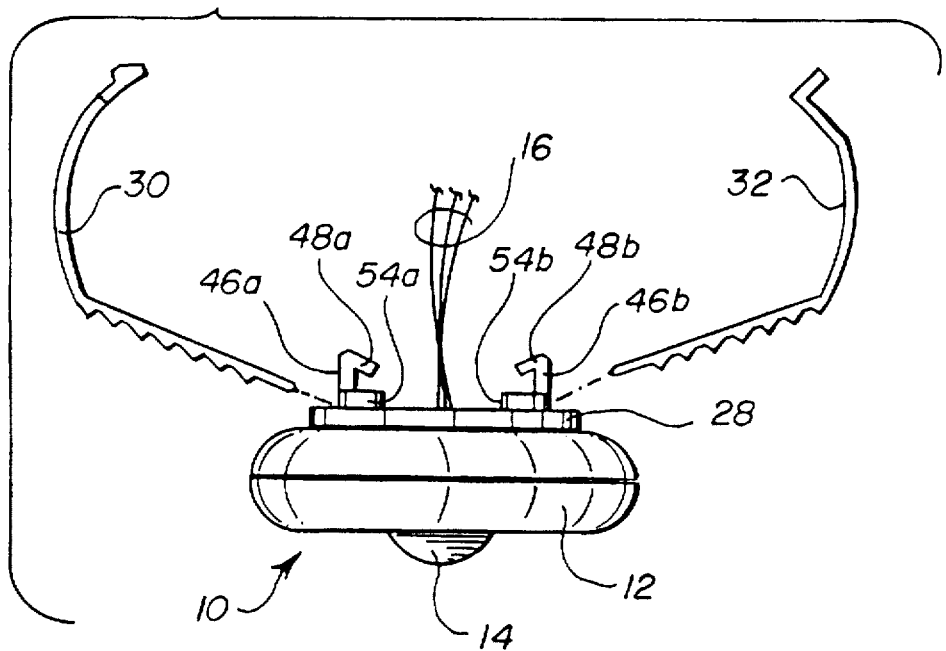
FIGS. 9 and 10 are elevational views of the assembled device and support member, in preparation for and after installation, respectively, on a conventional track member supporting ceiling panel, the track member and associated panels being shown in section.
Figure 10:
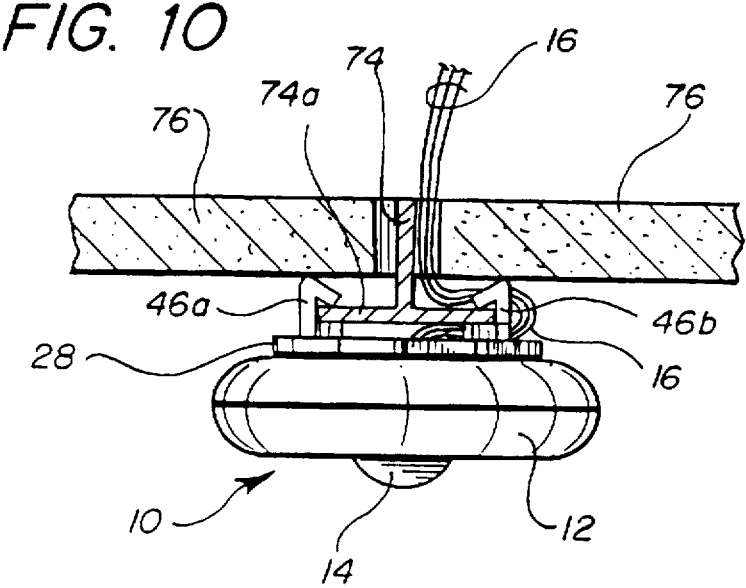

Turning now to FIGS. 9 and 10, a second manner of mounting the device is illustrated. In this mounting alternative the device is supported on a conventional framing member of a suspended ceiling. Arms 30 and 32 are not used in this manner of mounting and, accordingly, are torn or cut off at hinged connections 34 and 36 and discarded, as indicated in FIG. 9. An inverted T-shaped framing member 74 is shown in FIG. 10 with ceiling panels 76 carried by the horizontally disposed flanges 74a thereof.

The device is positioned with centerline 50 (FIG. 4) substantially aligned with the longitudinal center of the lower, horizontal surface of framing member 74. Upward movement of the device will cause outward deflection of legs 46a and 46b as the upper surfaces of hook portions 48a and 48b contact the frame member. When hook portions 48a and 48b move past the side edges of the horizontal portion 74a of frame member 74, legs 46a and 46b will return to their normal, undeflected positions with the hooked end portions engaged over the side edges of the horizontal flange of frame member 74, as seen in FIG. 10. The dimensions are such that the upper surfaces of wall portions 52a and 52b and of legs 54a and 54b contact the lower surface of frame member 74 when hook portions 48a and 48b are engaged over the side edges of the frame member. It will be understood, e.g., by inspection of FIG. 4, that legs 46a and 46b are offset from one another along the length of frame member 74. Wires 16 extend through the space between the vertical portion of frame member 74 and one of ceiling panels 76 for connection to wiring above the ceiling.

A third option for mounting the device is illustrated in FIGS. 11 and 12. Conventional electrical junction box 78 is mounted in the usual fashion, normally in an opening in a vertical wall surface. Planar wall plate 80, having central opening 82, is affixed by screws 84a and 84b to box 78. Arms 30 and 32 are not required in this manner of mounting and, accordingly, are removed and discarded as in the immediately preceding mounting option. Wires 16 are led through opening 82 for connection within box 78 to the usual electric wiring (not shown) therein.

The arcuate, outwardly facing surfaces of legs 54a and 54b lie on a circle slightly smaller in diameter than opening 82. Thus, as support member 20 is moved toward wall plate 80, with the axes of openings 44 and 82 aligned, the angled, upper surfaces of protrusions 56a and 56b will contact plate 80 adjacent the periphery of opening 82. Legs 54a and 54b will be deflected slightly outwardly until protrusions 56a and 56b pass the periphery of opening 82, whereupon the legs return to their unflexed configuration. The shoulders on protrusions 56a and 56b are then engaged with plate 80 at the periphery of opening 84, as seen in FIG. 12, and support member 20, together with device 10, is mounted upon plate 80. The outer surfaces of legs 46a and 46b and arcuate wall portions 52a and 52b also lie on a circle slightly smaller than the diameter of opening 82; since hook portions 48a and 48b extend inwardly from legs 46a and 46b, such structure extends through opening 84 and does not interfere with the mounting of support member 20 upon plate 80.

From the foregoing it will be seen that the invention provides a versatile mounting means for a PIR device, permitting mounting upon either a horizontal (ceiling) or vertical (wall) surface in any of three different mounting options. In two of the mounting options, i.e., those illustrated in FIGS. 7 and 8 and in FIGS. 11 and 12, support member 20 and device 10 may be jointly rotated about the central axis of lens 14 for selective positioning of the long and short viewing axis segments of the lens as indicated by arrows 86L and 86S in FIG. 8. To further aid in such adjustment, an indicum such as raised portion 88 is provided on housing 12 adjacent a known type (long or short viewing axis) of lens segment. Although the device and support member cannot be rotated about the lens axis when mounted upon a suspended ceiling track member, they may be moved longitudinally along the track member. Also, screw 22 may be loosened and device 10 rotated about the axis of screw 22 with respect to support member 20 through an angle of 90° or more and releasably fixed in the desired angular orientation, by frictional engagement of extension 24 on support member 20 between lug 18a on housing 12 and nut 26.

What is claimed is:

1. A PIR device and means for mounting said device comprising:
   a) housing means defining an enclosed space containing electrical elements of said device;
   b) a lens element having a central axis and mounted upon said housing to focus infrared radiation upon one of said electrical elements;
   c) a support member;
   d) first means for mounting said housing upon said support member;
   e) second means for mounting said support member upon a first type of pre-existing structure; and
   f) third means for mounting said support member upon a second type of pre-existing structure, alternatively to said first type of structure.

2. The invention according to claim 1 wherein said first type of structure is a ceiling panel having a through opening and said second means includes portions of said support member extending through said opening and engaged with the periphery thereof.

3. The invention according to claim 2 wherein said second type of structure is an inverted T-shaped track member having a horizontally disposed flange for supporting ceiling panels, and said third means includes a pair of elements engageable with opposite edge portions of said horizontally disposed flange.

4. The invention according to claim 2 wherein said second type of structure is a wall plate having a second opening and said third means includes a pair of elements engageable with said wall plate adjacent the periphery of said second opening.

5. The invention according to claim 1 and further including fourth means for mounting said support member upon a third type of pre-existing structure.

6. The invention according to claim 5 wherein said first type of pre-existing structure is a panel of a suspended ceiling having a first, through opening therein, said second type of pre-existing structure is an inverted T-shaped track member having a horizontally disposed flange for supporting ceiling panels, and said third type of pre-existing structure is a wall plate having a second, through opening therein.

7. The invention according to claim 6 wherein said second means includes integral portions of said support member adapted to extend through said first opening from a lower side of said ceiling panel upon which said housing means is positioned to an upper side with said integral portions engaging said ceiling panel adjacent portions of the peripheral edge of said first opening.

8. The invention according to claim 7 wherein said integral portions comprise a pair of flexible arms each extending from anchored positions on said lower side of said ceiling panel to positions on said upper side wherein said arms are spaced more widely than the distance between said positions of said peripheral edge.

9. The invention according to claim 6 wherein said third means comprise a pair of legs extending integrally from said support member, said legs being laterally spaced by a distance substantially equal to the width of said horizontally disposed flange, each of said legs having inwardly directed hook means for engagement over the edges of said flange.

10. The invention according to claim 6 wherein said fourth means comprise a pair of legs extending integrally from said support member, said legs being laterally spaced by a distance substantially equal to a cross-dimension of said second opening, each of said legs having outwardly directed hook means for engagement with said wall plate adjacent the periphery of said second opening.

11. A versatile mounting system for PIR device, said mounting system comprising a member having
   (a) integral, first engagement means constructed and arranged for releasable engagement with a suspended ceiling panel having a through opening therein and
   (b) integral hook-shaped second engagement means arranged for resilient releasable engagement with an inverted T-shaped track member having a horizontal flange for supporting ceiling panels.

12. The invention according to claim 11 wherein said member includes a rigid portion and said first engagement means comprises a pair of elongated, flexible portions affixed to said rigid portion and movable between an unflexed position wherein parts of said flexible portions are laterally spaced from one another by a distance greater than the diameter of said opening, and a flexed position wherein said flexible portions are spaced from one another by less than said diameter along their entire lengths, thereby permitting insertion of said flexible portions through said opening prior to return of said flexible portions to said unflexed position.

13. The invention according to claim 12 wherein said flexible portions are connected to said rigid portion by integral hinge means.

14. The invention according to claim 13 wherein said flexible portions comprise a pair of elongated arms attached to said rigid portion at spaced positions thereon by said hinge means.

15. The invention according to claim 11 wherein said member includes a rigid portion and said second engagement means comprises a pair of legs extending from spaced positions on said rigid portion to terminal ends each having a hook portion for engagement over the horizontal flange of said track member.

16. The invention according to claim 15 wherein said legs are positioned on opposite sides of an axis parallel to the centerline of said horizontal flange when said device is mounted upon said track member, and said hook portions extend from said terminal ends toward said axis.

17. The invention according to claim 16 wherein said rigid portion includes a planar surface from which said legs extend, said planar surface lying in a substantially horizontal plane when said device is mounted upon said track member.

18. The invention according to claim 11 wherein said member includes a rigid porton and said first engagement means comprises a pair of elongated, flexible portions affixed to said rigid portion and movable between an unflexed position wherein parts of said flexible portions are laterally spaced from one another by a distance greater than the diameter of said opening, and a flexed position wherein said flexible portions are spaced from one another by less than said diameter along their entire lengths, thereby permitting insertion of said flexible portions through said opening prior to return of said flexible portions to said unflexed position.

19. The invention according to claim 18 wherein said flexible portions are connected to said rigid portion by integral hinge means.

20. The invention according to claim 19 wherein said flexible portions comprise a pair of elongated arms attached to said rigid portion at spaced positions thereon by said hinge means.

21. The invention according to claim 11 wherein said member includes a rigid portion and said second engagement means comprises a pair of legs extending from spaced positions on said rigid portion to terminal ends each having a hook portion for engagement over portions of said wall plate adjacent the periphery of said second opening.

22. The invention according to claim 21 wherein said legs are positioned on opposite sides of said second opening when said device is mounted upon said wall plate, and said hook portions extend from said terminal ends in outwardly opposite directions.

23. The invention according to claim 22 wherein said rigid portion includes a planar portion from which said legs extend, said planar surface lying in a substantially vertical plane when said device is mounted upon said wall plate.

24. The invention according to claim 11 wherein said member includes a rigid portion and said second engagement means comprises a pair of legs extending from spaced positions on said rigid portion to terminal ends each having a hook portion for engagement over portions of said wall plate adjacent the periphery of said opening.

25. The invention according to claim 24 wherein said legs are positioned on opposite sides of said opening when said device is mounted upon said wall plate, and said hook portions extend from said terminal ends in outwardly opposite directions.

26. The invention according to claim 25 wherein said rigid portion includes a planar portion from which said legs extend, said planar surface lying in a substantially vertical plane when said device is mounted upon said wall plate.

27. The invention according to claim 11 wherein said member includes a rigid portion and said first engagement means comprises a pair of legs extending from spaced positions on said rigid portion to terminal ends each having a hook portion for engagement over the horizontal flange of said track member.

28. The invention according to claim 27 wherein said legs are positioned on opposite sides of an axis parallel to the centerline of said horizontal flange when said device is mounted upon said track member, and said hook portions extend from said terminal ends toward said axis.

29. The invention according to claim 28 wherein said rigid portion includes a planar surface from which said legs extend, said planar surface lying in a substantially horizontal plane when said device is mounted upon said track member.

30. The invention according to claim 11 wherein said member includes a rigid portion and said first engagement means comprises a first pair of legs extending from respective, first spaced positions on said rigid portion to first terminal ends each having a first hook portion for engagement over the horizontal flange of said track member, and said second engagement means comprises a second pair of legs extending from respective, second spaced positions on said rigid portion to second terminal ends each having a second hook portion for engagement over portions of said wall plate adjacent the periphery of said opening.

31. The invention according to claim 30 wherein said first and second legs having outer surfaces spaced a short distance inwardly of said periphery of said opening when said device is mounted upon said wall plate.

32. The invention according to claim 31 wherein said opening is circular and of predetermined diameter, and said outer surfaces of each of said first and second legs lie in a substantially common, cylindrical plane having a diameter a few thousandths of an inch less than said predetermined diameter.

33. The invention according to claim 11 wherein said member further includes integral, third engagement means constructed and arranged for alternate, releasable engagement with a third type of pre-existing structure, different from said first and second types.

34. The invention according to claim 33 wherein said first, second and third types of structure comprise a suspended ceiling panel having a first, through opening therein, an inverted T-shaped track member having a horizontally disposed flange for supporting ceiling panels, and a substantially planar wall plate having a second, through opening therein, respectively.

35. The invention according to claim 34 wherein said member includes a rigid portion and said first, second and third engagement means comprise first, second and third pairs of engagement members, respectively, all of said engagement members extending integrally from said rigid portion at spaced positions thereon.

36. The invention according to claim 35 wherein said rigid portion has a substantially planar surface and said engagement members of each of said pairs extend from said rigid portion at positions on opposite sides of a central axis perpendicular to said surface.

37. The invention according to claim 36 wherein said engagement members of said first pair are greatly elongated with respect to the engagement members of said second and third pairs.

38. The invention according to claim 37 wherein the engagement members of said first pair are each hingedly connected at one end to said rigid portion, and extend to terminal ends having mutually engagable means for selective connection of said terminal ends.

39. The method of mounting a PIR device on a planar panel having front and rear sides, said method comprising:
a) forming a through opening having a predetermined cross-dimension in said panel;
b) providing a pair of elongated, flexible members connected to said device and extending in angularly divergent directions to an unflexed position in which respective portions of said members are laterally spaced from one another by a distance greater than said cross-dimension;
c) exerting a force on said members to effect movement of said portions toward one another to a flexed position wherein said portions are laterally spaced by a distance less than said cross-dimension;
d) moving at least said portions of said members through said opening, from the front to the rear side of said panel, said device remaining on the front side;
e) removing said force to permit said members to return to said unflexed position with said first portions of said members laterally spaced by a distance greater than said cross-dimension on the rear side of said panel and second portions of said members contacting said panel adjacent said opening to support said PIR device in an operative position on the front side of said panel.

40. A PIR device and means for mounting and orienting said device comprising:
a) housing means defining an enclosed space containing electrical elements of said device;
b) a lens element having a central axis and circumferentially alternating segments of different focal angles extending outwardly from said central axis, said lens element being fixedly connected to said housing means to focus infra-red radiation upon one of said electrical elements;
c) means fixedly positioned with respect to said housing means for engagement with a predetermined type of pre-existing structure to support said housing means upon said structure in a manner permitting rotation of said housing means, and thereby said lens element, about said central axis; and
d) indicia fixedly positioned with respect to one of said segments having a known one of said focal angles, whereby the rotational position of said housing means is indicative of the directional orientation of a lens segment of known focal angle.

41. The invention according to claim 40 and further including a mounting member and means for connecting said housing means to said mounting member, said engagement means comprising a plurality of engagement members extending integrally from said mounting member.

42. The invention according to claim 41 wherein pre-existing structure comprises both a ceiling panel having a first opening therein and a wall plate having a second opening therein, and said engagement means comprises a plurality of arms adapted to extend through said first opening and contact said ceiling panel adjacent the periphery of said first opening and a plurality of legs adapted to extend through said second opening and contact said wall plate adjacent the periphery of said second opening.

43. The invention according to claim 40 wherein said indicia is positioned on said housing means radially outwardly of said one of said segments.

44. The invention according to claim 43 wherein said housing means encircles said lens element.

45. The invention according to claim 40 wherein said pre-existing structure is a ceiling panel.

46. The invention according to claim 45 wherein said ceiling panel has a through opening and said engagement means comprise a plurality of arm members extending through said opening and contacting said panel adjacent the periphery of said opening.

47. The invention according to claim 40 wherein said pre-existing structure is a wall plate.

48. The invention according to claim 47 wherein said wall plate has a through opening and said engagement means comprises a plurality of leg members extending through said opening and contacting said wall plate about the periphery of said opening.

49. A mounting member for a PIR device which includes a housing, a substantially hemispherical lens having a central axis fixedly connected to said housing, and a first connecting means, said mounting member comprising:
a) second connecting means for co-operative engagement with said first connecting means to effect mutual connection of said housing and said mounting member;
b) first engagement means for engaging a first type of pre-existing structure to mount said PIR device in an operative position upon said structure and permitting manual, concurrent rotation of said mounting member and said device about said central axis;
c) means for effecting rotation of said housing with respect to said mounting member about a rotational axis to rotate said central axis in a plane perpendicular to said central axis; and
d) means for selectively, releasably fixing the relative positions of said housing and said mounting member with respect to said rotational axis.

50. The invention according to claim 49 wherein said first structure is a ceiling panel having a through opening therein, and said first engagement means comprises a plurality of elongated, flexible arms adapted to extend through said opening and engage said panel adjacent the periphery of said opening.

51. The invention according to claim 50 wherein said mounting member further comprises a rigid portion and said flexible arms are integrally attached to said rigid portion.

52. The invention according to claim 49 wherein said rotational axis is laterally spaced from said central axis.

53. The invention according to claim 52 wherein said fixing means comprises means for effecting frictional engagement of adjacent surfaces of said housing and said mounting means.

54. The invention according to claim 53 wherein said adjacent surfaces are on said first and second connecting means.

55. The invention according to claim 54 wherein said means for effecting frictional engagement comprises a threaded fastener which may be selectively tightened and loosened to maintain said housing and said mounting member in frictional engagement and to permit relative movement thereof about said rotational axis, respectively.

56. The invention according to claim 49 wherein said first structure is a wall plate having a through opening therein, and said first engagement means comprises a plurality of legs adapted to extend through said opening and engage said plate adjacent the periphery of said opening.

57. The invention according to claim 56 wherein said mounting member further comprises a rigid portion and said legs are integrally attached to said rigid portion.

58. The invention according to claim 49 wherein said first structure is a ceiling panel having a first, through opening therein, said first engagement means comprises a plurality of elongated, flexible arms adapted to extend through said first opening and engage said panel adjacent the periphery of said first opening, and said mounting member further comprises second engagement means for engaging a second type of pre-existing structure.

59. The invention according to claim 58 wherein said second structure comprises a wall plate having a second, through opening therein, and said second engagement means comprises a plurality of legs adapted to extend through said second opening and engage said plate adjacent the periphery of said second opening.

60. The invention according to claim 59 wherein said mounting member further comprises a rigid portion and all of said pluralities of arms and legs are formed integrally with and extend from said rigid portion.

61. A mounting member for a PIR device comprising:
a) a substantially rigid, central portion;
b) a plurality of elongated, flexible arms extending from said rigid portion for engagement with a ceiling panel;
c) a plurality of first legs extending from said rigid portion for engagement with an inverted T-shaped track member for supporting ceiling panels; and
d) a plurality of second legs extending from said rigid portion for engagement with a wall plate, whereby said mounting member may be selectively engaged with any of said panel, said track member and said plate to mount said PIR device in an operative position thereon.

62. The invention according to claim 61 wherein said central portion, said arms and said first and second legs are integrally formed.

63. The invention according to claim 61 wherein said central portion has a central axis and each of said arms and said first and second legs are spaced from one another, alternately, about said axis.

64. The invention according to claim 63 wherein said arms are attached to said central portion by respective, integral hinges.

65. The invention according to claim 63 wherein said first legs each have a terminal end with a hook portion directed inwardly with respect to said axis, and said second legs each have a terminal end with a hook portion directed outwardly with respect to said central axis.

66. A mounting member for releasable engagement with a ceiling panel having lower and upper sides and a through, circular opening of predetermined diameter, said mounting member comprising:
a) a substantially rigid central portion having a major surface with a central axis perpendicular thereto and a cross-dimension greater than said predetermined diameter;
b) a plurality of elongated, flexible arms each anchored at a first end to said central portion and extending to a second end; and
c) said arms being movable between an unflexed position wherein portions of said arms intermediate of said first and second ends are spaced by a distance greater than said predetermined diameter, and a flexed position wherein said arms are spaced from one another along their entire lengths by a distance less than said predetermined diameter;
whereby said arms may be moved to said flexed position and inserted through said opening from said lower to said upper side of said panel and, upon return of said arms to said unflexed position, said portions of said arms engage said panel adjacent the periphery of said opening and retain said mounting member upon said panel.

67. The invention according to claim 66 wherein the number of said arms is two, said arms being anchored to said rigid portion on opposite sides of said axis at positions spaced by a distance less than said predetermined diameter.

68. The invention according to claim 67 wherein said arms are anchored to said rigid portion by respective, integral hinges.

69. The invention according to claim 67 wherein said arms include cooperative connecting means at said second ends for joining said second ends to one another.

70. The invention according to claim 69 wherein said connecting means are formed integrally with said arms.

71. The invention according to claim 67 wherein said portions of said arms include a plurality of transversely extending, longitudinally spaced teeth for engagement with the edge of said panel bordering said opening on said upper side of said panel when said arms extend through said opening in said unflexed position.

72. The invention according to claim 71 wherein said major surface is substantially planar and flush with the lower surface of said ceiling panel when said teeth are engaged therewith.

\* \* \* \* \*